United States Patent
Ranganathan et al.

(10) Patent No.: US 11,934,614 B1
(45) Date of Patent: Mar. 19, 2024

(54) SYSTEM AND METHOD FOR BROKEN SCREEN RECOGNITION

(71) Applicant: VERIZON PATENT AND LICENSING INC., Basking Ridge, NJ (US)

(72) Inventors: Prakash Ranganathan, Tamilnadu (IN); Saurabh Tahiliani, Uttar Pradesh (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/971,145

(22) Filed: Oct. 21, 2022

(51) Int. Cl.
*G06F 3/041* (2006.01)
*G06F 3/044* (2006.01)
*H04N 25/68* (2023.01)

(52) U.S. Cl.
CPC ......... *G06F 3/0418* (2013.01); *G06F 3/0416* (2013.01); *G06F 3/044* (2013.01); *G06F 3/0412* (2013.01); *G06F 3/0445* (2019.05); *H04N 25/68* (2023.01)

(58) Field of Classification Search
CPC ...... G06F 3/0416; G06F 3/044; G06F 3/0412; G06F 3/0418; G06F 3/0445; H04N 25/68; G01D 5/24; G01D 18/00
See application file for complete search history.

(56) References Cited

U.S. PATENT DOCUMENTS

| | | | | |
|---|---|---|---|---|
| 8,279,197 B2* | 10/2012 | Murphy | ............... | G06F 11/2221 345/173 |
| 9,977,540 B2* | 5/2018 | Jang | ................... | G06F 3/0421 |
| 10,025,438 B2* | 7/2018 | Gong | ................... | G06F 3/0412 |
| 10,132,857 B2* | 11/2018 | Heo | ...................... | G06F 3/0418 |
| 2002/0047565 A1* | 4/2002 | Nara | ................... | G09G 3/3233 315/169.3 |
| 2006/0028233 A1* | 2/2006 | Arazaki | ................ | H04N 25/68 348/E5.081 |
| 2010/0283501 A1* | 11/2010 | Tsai | ...................... | G06F 3/042 324/760.02 |
| 2013/0107027 A1* | 5/2013 | Muellhaeuser | ......... | G06F 3/017 348/77 |
| 2013/0321010 A1* | 12/2013 | Cooley | ............... | G06F 3/0446 324/543 |
| 2014/0253494 A1* | 9/2014 | Jiang | ................... | G06F 3/0418 345/174 |
| 2016/0085376 A1* | 3/2016 | Mabie | ................ | G06F 3/0482 345/178 |
| 2019/0107578 A1* | 4/2019 | Marinov Peev | ....... | G01D 18/00 |
| 2020/0272269 A1* | 8/2020 | Dunn | ................... | G06F 3/0412 |
| 2021/0302581 A1* | 9/2021 | Rosenberg | ........... | G06F 3/0421 |
| 2022/0101790 A1* | 3/2022 | Wetherell | ............ | G09G 3/3233 |
| 2022/0247946 A1* | 8/2022 | Chossat | ................. | H04N 25/68 |
| 2023/0200181 A1* | 6/2023 | Park | ...................... | H10K 59/40 345/173 |

* cited by examiner

*Primary Examiner* — Darlene M Ritchie (57) ABSTRACT

Disclosed are systems and methods for an anomaly detection framework that operates as an executable analysis tool for devices to operate in order to determine whether the device contains an unresponsive touch screen (e.g., defective or malfunctioning touch screen). The disclosed framework can analyze the capacitance capabilities of the touch screen, inclusive of the touch layers associated with the touch screen panel, and determine when a device's touch screen is unresponsive to user provided input, which can be any type of touch or gesture provided on a touch screen.

20 Claims, 10 Drawing Sheets

SYSTEM AND METHOD FOR BROKEN SCREEN RECOGNITION

BACKGROUND

Modern smartphones, tablets and/or other devices that have touch screen displays and capabilities may have unresponsive screens indicating that the device has malfunctioned or is not functioning at all. An unresponsive screen can be due to a crack, chip or defect in the display pane, a crack, chip or defect in/on one of the layers of the touch screen, moisture accumulating or present within such layers, and/or the like. These types of defects can prevent a device from properly recognizing a user's touch input, thereby rendering the device unresponsive.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

The disclosed systems and methods provide a touch screen anomaly detection framework that is configured to determine when a device's touch screen is unresponsive to user provided input. User input can include a touch input (also referred to as a gesture, interchangeably), which can include, but is not limited to, a tap, depression, swipe, pinch (e.g., zoom out), stretch (e.g., zoom in), scroll, and the like, performed by a user's finger(s).

There are numerous benefits in determining whether a device's touch screen is unresponsive, such as, by way of non-limiting example, determining whether applications executing on a device are operating correctly, whether the latest operating system is installed and/or operating correctly, whether malware or other forms of malicious software are installed thereby preventing proper operation, and the like. Moreover, ascertaining whether a device's screen is unresponsive can impact how and/or whether a device can be traded-in for a device upgrade.

Currently, trade-ins are one of the primary mediums of device purchases for a majority of retail and carrier providers in the United States. For example, Verizon® alone processed 2.06 million trade-ins in the fourth quarter (Q4) of 2021. While the current trade-in disqualification rate stands at or around 3%, given the volume of trade-ins being at 60,000 per quarter, this number represents a large number of devices being disqualified.

One of the primary reasons a device is disqualified for a trade-in is due to the device having an unresponsive touch screen. As mentioned above, this can be due to a cracked display panel and/or damaged touch layer.

The disclosed systems and methods provide a novel approach to detecting broken or malfunctioning touch screens, which can result in cost savings (for both the consumer and device provider) and improved customer service. As discussed below in more detail, the disclosed systems and methods provide a framework that can automatically detect whether a touch screen device is malfunctioning. Such detection can occur prior to a trade-in or subsequent to a request to determine whether a trade-in is viable for a device. The detection functionality disclosed herein can prevent unnecessary processing by the carrier (or manufacturer) with respect to determining whether a device is qualified for a trade-in (e.g., can be performed by the user and/or when the user is still in possession of the device), while providing an up-front, transparent mechanism for a consumer to discern whether the device is qualified as a trade-in.

Thus, as discussed herein, the disclosed framework provides an executable analysis tool for devices in order to determine whether the device contains an unresponsive touch screen (e.g., cracked or malfunctioning touch screen). In some embodiments, the framework can utilize the capacitive capabilities of touch screens to detect anomalies within the layers of the touch screen as well as those associated with the touch screen display panel. In some embodiments, the framework can base anomaly detection on whether pixels are capable of producing an output on the display screen of the device. Contrary to the traditional approaches of performing a visual inspection of a touch screen, which is known to be prone to errors, the disclosed functionality enables a more efficient and accurate assessment of the status of a device's touch screen (e.g., working properly or wholly or partially unresponsive/inoperative).

According to some embodiments, the disclosed framework can operate as a stand-alone application executing on or in connection with a user's device. In some embodiments, the framework can operate as part of an existing or other application (e.g., My Verizon, for example). In some embodiments, the framework may require root level privileges of a user's device in order to execute.

Figure 1:
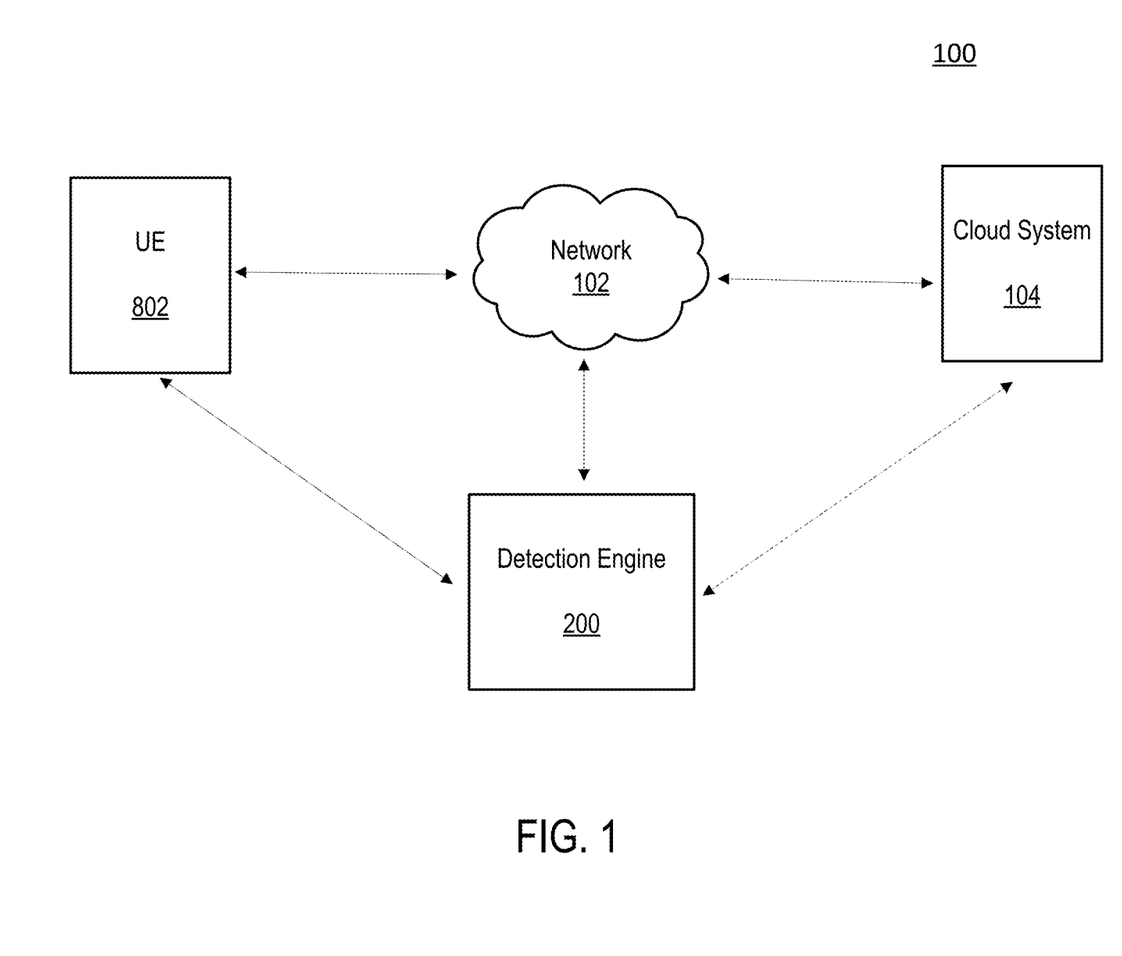
FIG. 1 is a block diagram of an example configuration within which the systems and methods disclosed herein could be implemented according to some embodiments of the present disclosure.

With reference to FIG. 1, system 100 is depicted which includes user equipment (UE) 902, network 102, cloud system 104 and detection engine 200. UE 802 can be any type of device, such as, but not limited to, a mobile phone, tablet, laptop, Internet of Things (IoT) device, autonomous machine, and any other device equipped with touch screen display. Further discussion of UE 802 is provided below in reference to FIGS. 8 and 9.

Network 102 can be any type of network, such as, but not limited to, a wireless network, cellular network, the Internet, and the like. Network 102 facilitates connectivity of the components of system 100, as illustrated in FIG. 1. A further discussion of the network configuration and type of network is provided below in reference to FIG. 8.

Cloud system 104 can be any type of cloud operating platform and/or network based system upon which applications, operations, and/or other forms of network resources can be located. For example, system 104 can be a service provider and/or network provider from where applications can be accessed, sourced or executed from. For example, system 104 can correspond to Verizon® services, whereby the "My Verizon" application can be hosted and/or provided. In some embodiments, cloud system 104 can include a server(s) and/or a database of information which is accessible over network 102. In some embodiments, a database (not shown) of cloud system 104 can store a dataset of data and metadata associated with local and/or network information related to a user(s) of UE 802 and the UE 802, and the services, applications, content rendered and/or executed by UE 802.

Detection engine 200, as discussed above, includes components for performing broken screen recognition of devices (UE 802) connected to network 102. Detection engine 200 can be a special purpose machine or processor and could be hosted by UE 802. In some embodiments, engine 200 can be hosted by a peripheral device connected to UE 802.

According to some embodiments, as discussed above, detection engine 200 can function as an application installed on UE 802. In some embodiments, such application can be a web-based application accessed by UE 802 over network 102 from cloud system 104 (e.g., as indicated by the connection between network 102 and engine 200, and/or the dashed line between cloud system 104 and engine 200 in FIG. 1). In some embodiments, engine 200 can be configured and/or installed as an augmenting script, program or application (e.g., a plug-in or extension) to another application or program executing on UE 802.

Figure 2:
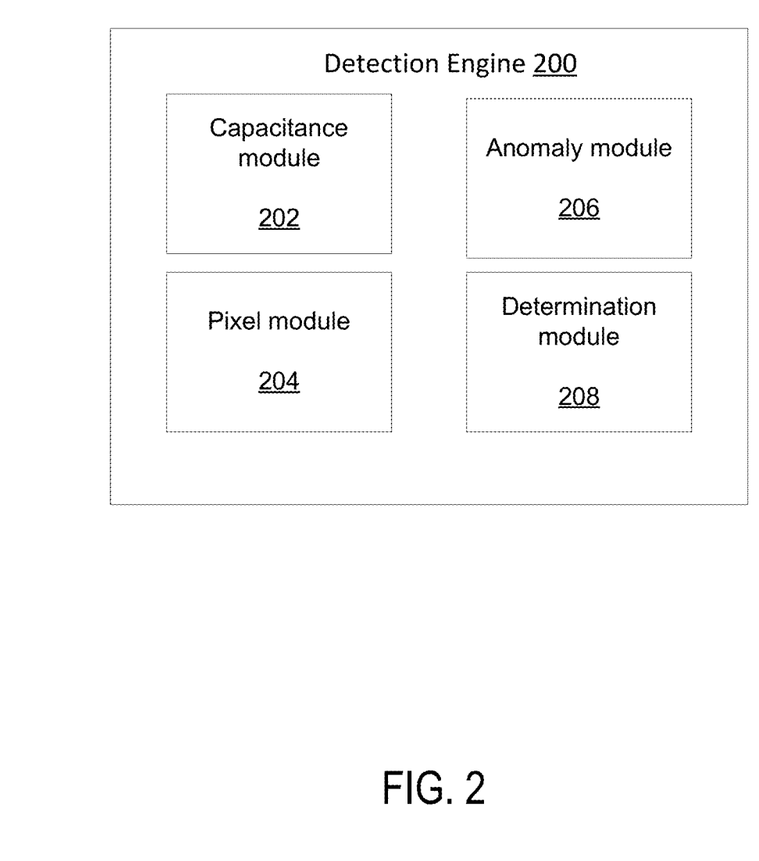
FIG. 2 is a block diagram illustrating components of an exemplary system according to some embodiments of the present disclosure.

As illustrated in FIG. 2, according to some embodiments, detection engine 200 includes capacitance module 202, pixel module 204, anomaly module 206 and determination module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
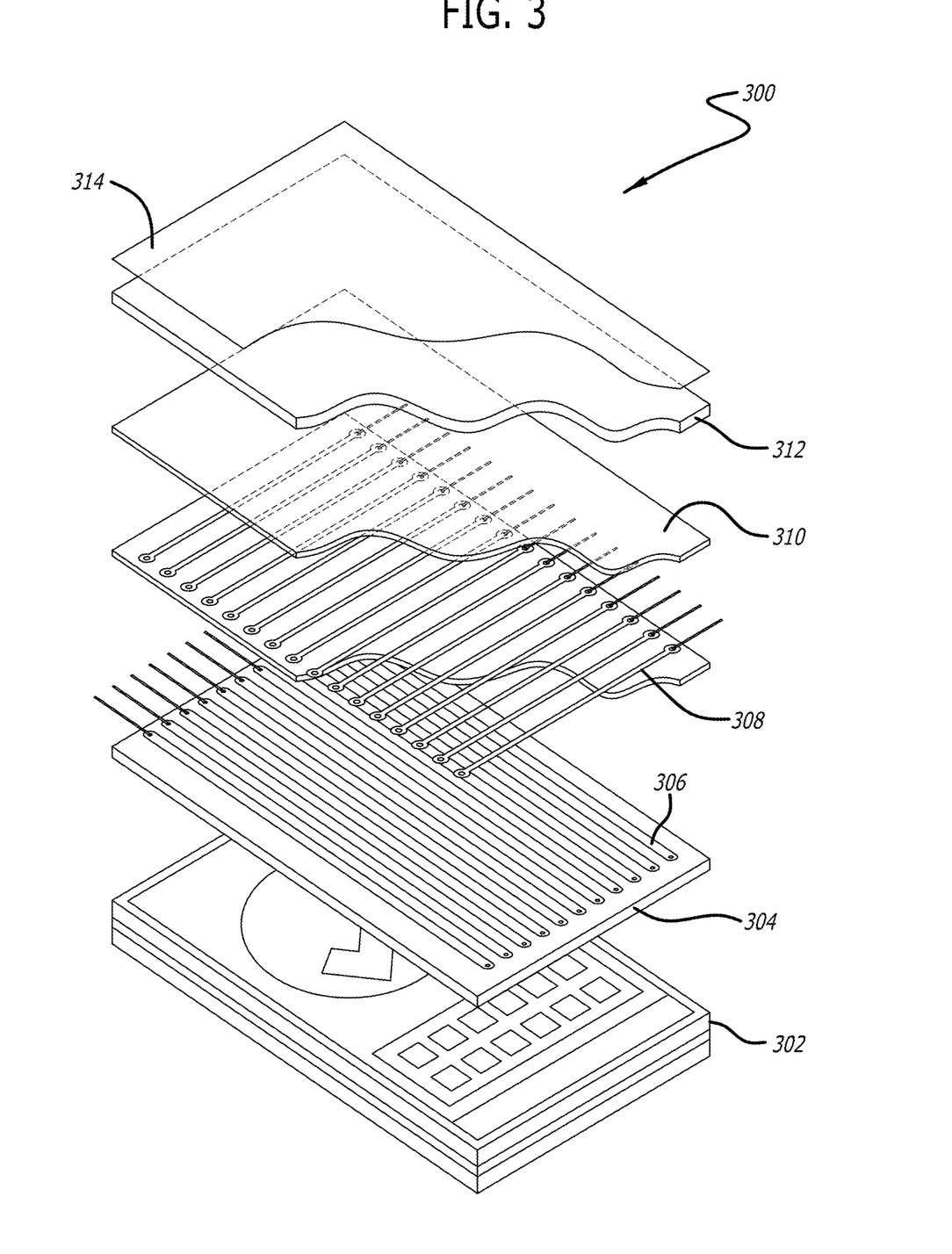
FIG. 3 illustrates an embodiment of an example touch screen display according to some embodiments of the present disclosure.

FIG. 3 depicts an example of a touch screen display system 300, which provides a mutual capacitance screen for an example device. For example, system 300 can correspond to a touch screen for a smart phone.

Touch screen display system 300 can include LCD (liquid crystal display) layer 302, glass substrate layer 304, sensing lines 306, driving lines 308, bonding layer 310, protective cover 312 and protective anti-reflective coating 314.

The LCD layer 302 corresponds to the screen of a device (not shown), which is attached to body of the device. The LCD layer 302 is covered by the glass substrate layer 304. The sensing lines 306 are bonded to the glass substrate layer 304. The bonding layer 310 is disposed above the glass substrate layer 304, and the bonding layer 310 is bonded with driving lines 308. On top of the bonding layer 310 is the protective cover 312 and the protective anti-reflective coating 314.

As depicted in FIG. 3, the driving lines 308 are disposed on the bonding layer 310, and the sensing lines 306 are disposed on the glass substrate layer 304. Lines 306 and 308 provide an example of mutual capacitance, whereby each carry a current, but are configured to carry such current to/from nodes on and/or between respective layers at 90 degree angles to each other. For example, the driving lines 308 carry an electric current on the bonding layer 310, and at a 90 degree angle to the driving lines 308, and the sensing lines 306 carry an electric current on the glass substrate layer 304.

Figure 4A:
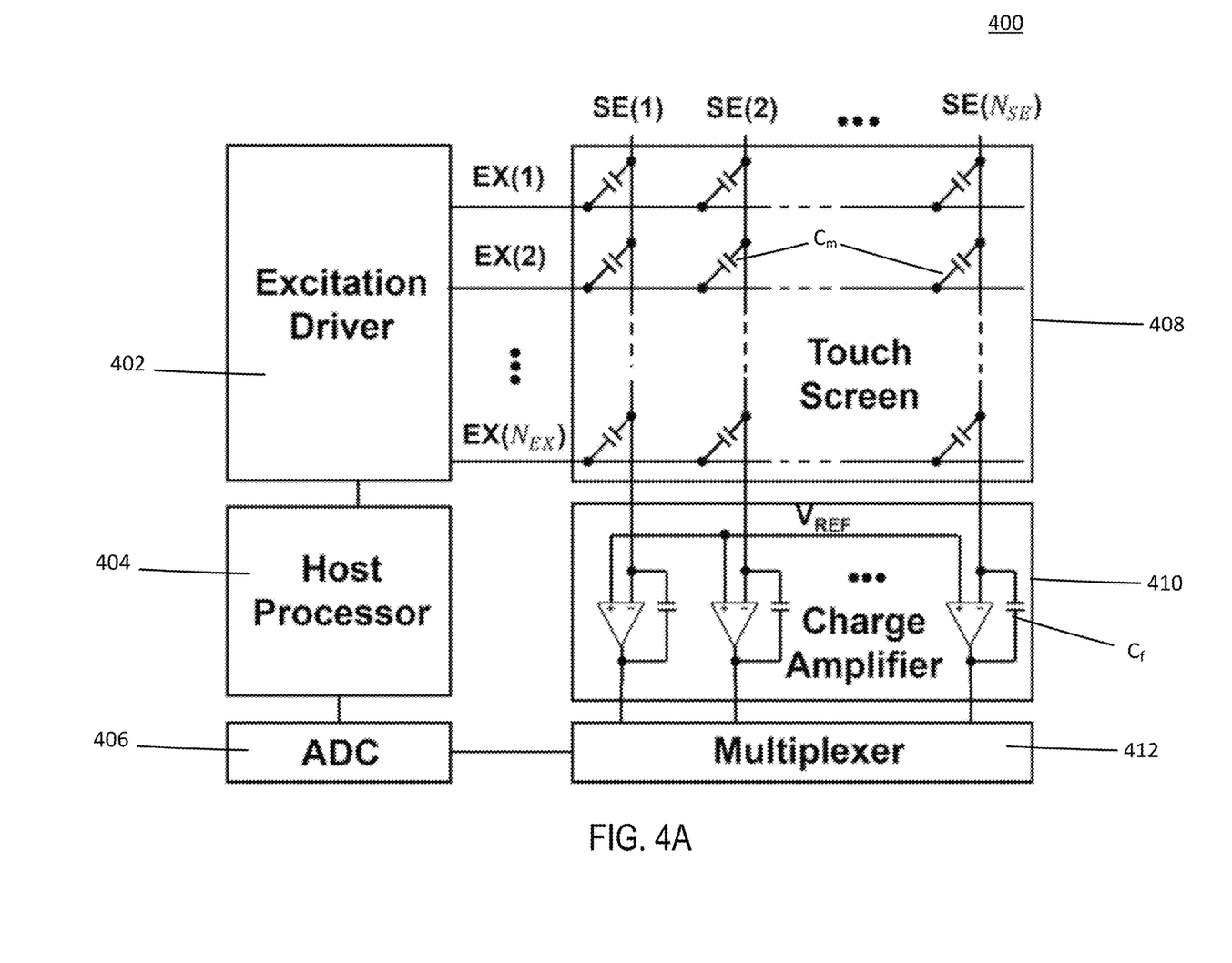
FIG. 4A illustrates an embodiment of an example mutual capacitance touch screen panel according to some embodiments of the present disclosure.

Turning to FIG. 4A, system 400 provides an example hardware configuration of a portion of a device (e.g., a smart phone) that processes touch input. System 400 includes an excitation driver 402, host process 404, ADC (analog-to-digital converter) 406, touch screen 408, charge amplifier 410 and multiplexer 412.

According to some embodiments, when a touch input is provided to a touch screen 408, this results in a distortion of the screen's electrostatic field, which is measurable as a change in capacitance. As discussed herein, this change in capacitance can be detected to identify a location within the touch screen 408.

As illustrated in FIG. 4A, according to some embodiments, an excitation driver 402 can be composed of excitation electrodes (EX) and sensing electrodes (SE). An example of these electrodes is illustrated in FIG. 3 and discussed above in relation to the driving lines 308 and sensing lines 306, respectively. Excitation driver 402 can generate EX pulses that arrive at charge amplifier(s) 410 that are attached to SE lines (e.g., sensing lines 306) through mutual capacitors ($C_m$) that are associated with touch screen 408, as depicted in FIG. 4A. Non-inverting input terminals of these charge amplifiers 410 are connected to the reference voltage ($V_{REF}$), and the charge transferred through a mutual capacitor ($C_m$) can be passed, via multiplexer 412, through a feedback capacitor(s) ($C_f$) for conversion via ADC 406 into analog voltages that are proportional to the mutual capacitance ($V_{OUT}$). These values can be provided to host processor 404 for processing the input as representative of touch input.

Figure 4B:
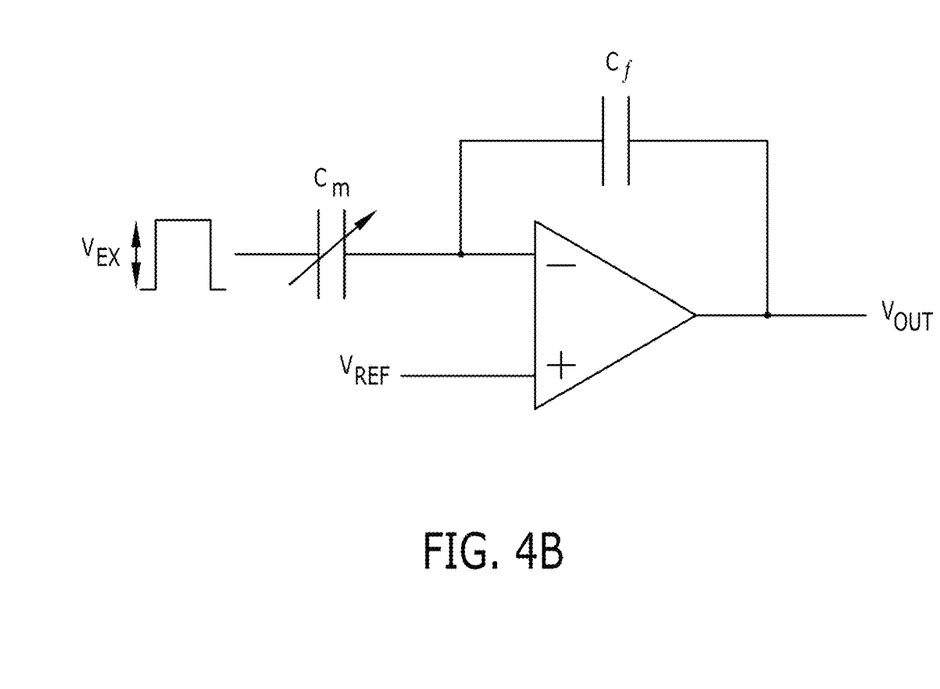
FIG. 4B provides an example of a mutual capacitance output for the exemplary touch screen of FIG. 4A according to some embodiments of the present disclosure.

An example of such processing is depicted in FIG. 4B, and can be realized via the below equation:

$$V_{OUT} = V_{REF} - (C_m/C_f)V_{EX}, \qquad \text{Eq. 1.}$$

Thus, when a user touches an area of the touch screen 408 with a finger(s), the reduction change in mutual capacitance can be sensed as a different output voltage of the charge amplifier 410 from the voltage level obtained without any touches.

Figure 4C:
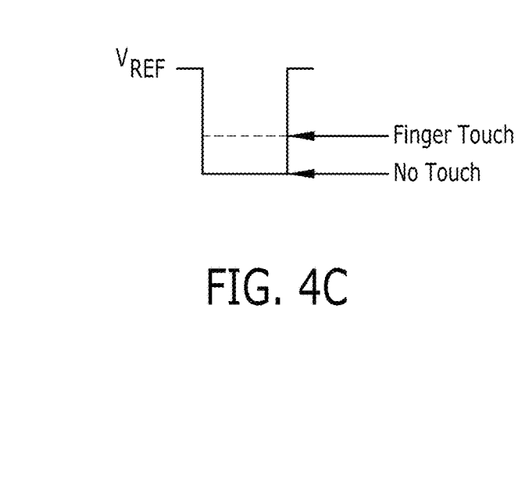
FIG. 4C provides an illustrative display of a threshold for recognizing a touch input according to some embodiments of the present disclosure.

In some embodiments, FIG. 4C depicts a non-limiting embodiment that illustrates an analysis regarding whether a touch input is recognized based on a touch input's voltage compared against an input threshold voltage. In some embodiments, the input threshold voltage can correspond to a voltage that has a value at a range or measure less than a total value of $V_{REF}$.

For example, when the $V_{OUT}$ is at or above the input threshold voltage, a finger touch is recognized. Accordingly, in some embodiments, the $V_{OUT}$ may be required to be above the input threshold voltage, and not simply equal to (or, e.g., within a range of standard deviation to) the input threshold voltage, for example.

By way of example, the input threshold voltage can be represented by the "dashed line" depicted in FIG. 4C. Further to the example depicted in FIG. 4C, when the voltage of $V_{OUT}$ is below the voltage reference, "no touch" may be recognized (e.g., a touch input is not detected).

Figure 5:
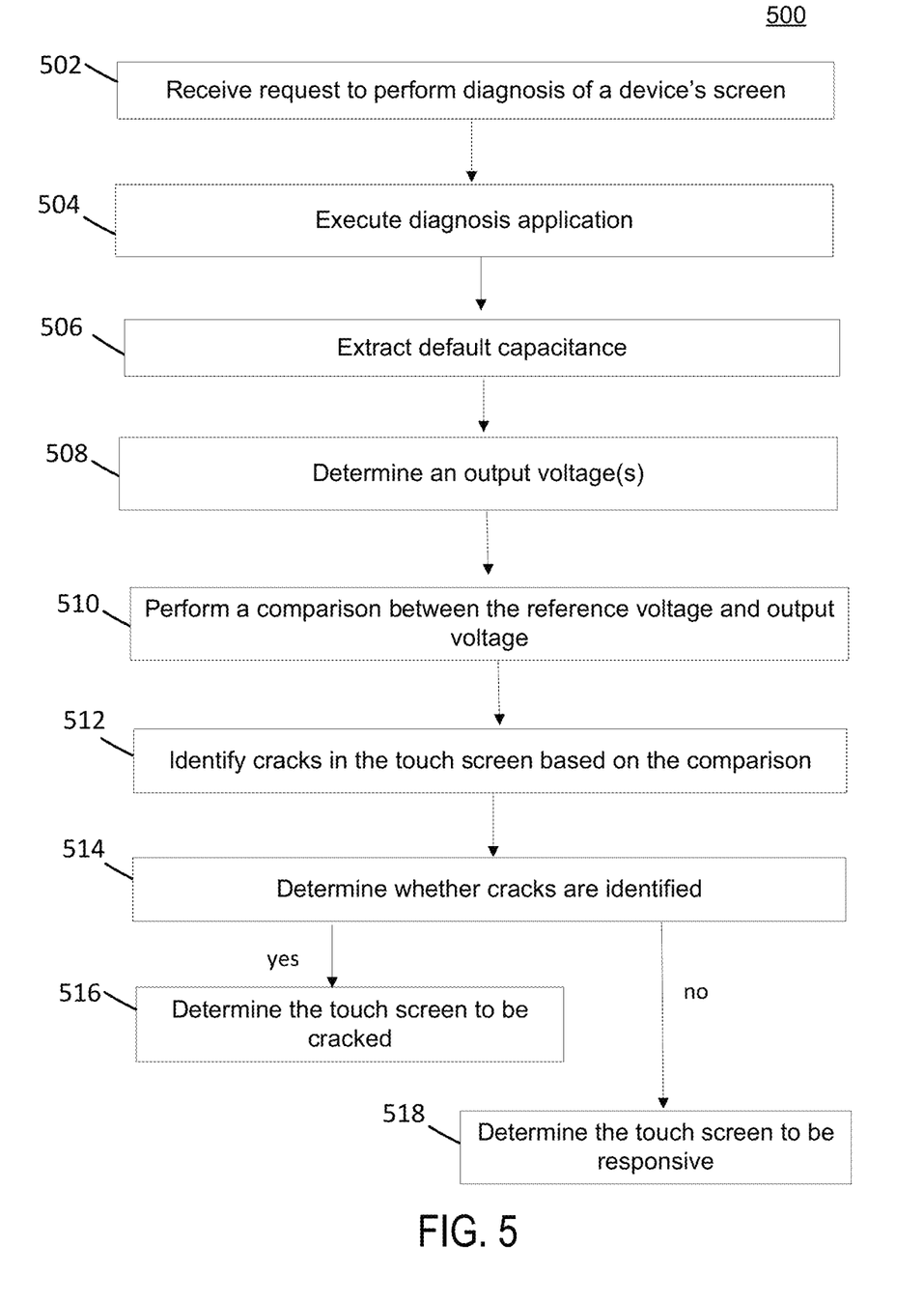
FIG. 5 illustrates an exemplary data flow according to some embodiments of the present disclosure.
Figure 6:
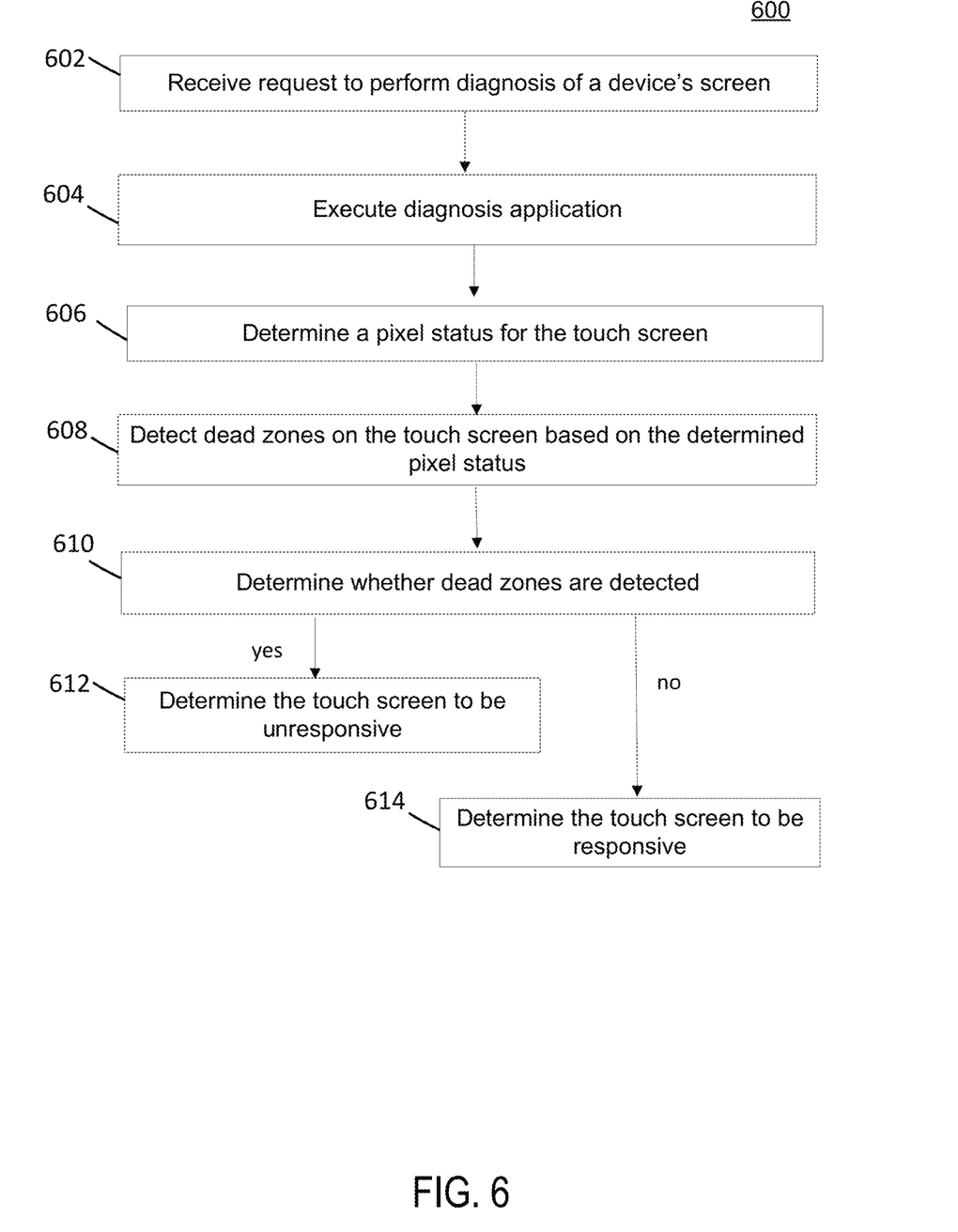
FIG. 6 illustrates an exemplary data flow according to some embodiments of the present disclosure.
Figure 7:
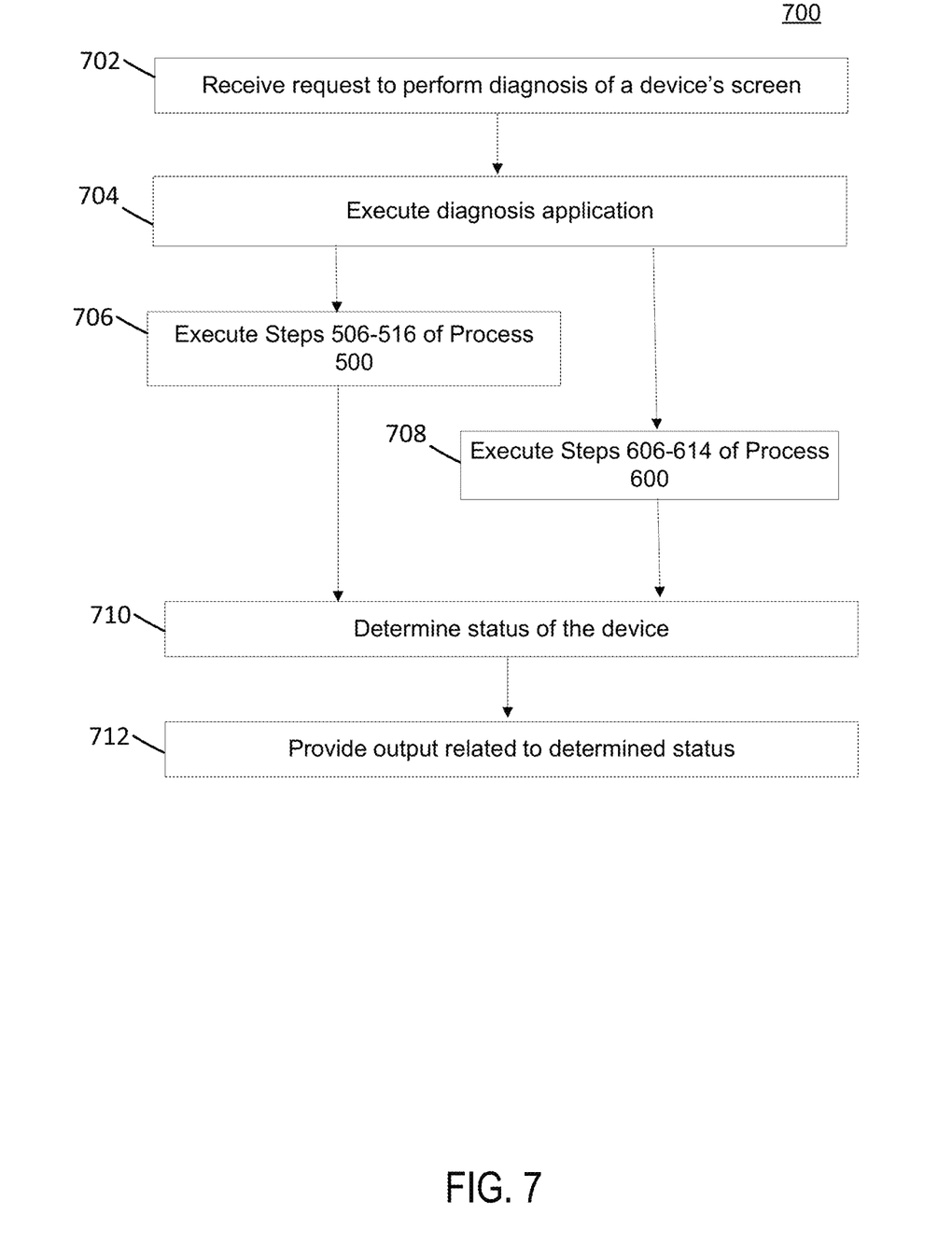
FIG. 7 illustrates an exemplary data flow according to some embodiments of the present disclosure.

Turning to FIGS. 5-7, provided are non-limiting example embodiments for an executable tool for devices to determine whether the device contains an unresponsive touch screen (e.g., cracked or malfunctioning touch screen).

FIG. 5 provides Process 500 which details embodiments for determining whether a touch screen is cracked (e.g., the touch screen display, for example, the LCD display 302, or any other layer depicted in FIG. 3, for example). FIG. 6 provides Process 600 which details embodiments for determining whether a touch screen is unresponsive (e.g., whether any of the pixels of the touch screen (e.g., per layer(s) of system 300) are defective). And, FIG. 7 provides Process 700 which details embodiments for performing Processes 500 and/or 600 to determine comprehensively the status of a device's touch screen.

Turning to FIG. 5, according to some embodiments, Steps 502-508 of Process 500 can be performed by capacitance module 202 of detection engine 200; Steps 510-512 can be performed by anomaly module 206; and Steps 514-518 can be performed by determination module 208.

Process 500 begins with Step 502 where a request to perform analysis of a device's screen is received by engine 200. As discussed above, such request can correspond to a request to determine whether a device has an unresponsive screen. In some embodiments, Step 502 can involve a user opening an application associated with engine 200. For example, opening the My Verizon application on the user's device and providing input or selecting an option requesting the device's screen be subject to analysis testing, as discussed herein. As discussed above, such application, or a similar type of application, can have functionality incorporated therein that enables the device-analysis capabilities of engine 200.

In Step 504, in response to the request received in Step 504, engine 200 can execute the application. According to some embodiments, Step 504 can involve performing the computational analysis steps of the process provided below. In other words, Step 504 involves the initiation, and collection and analysis of the touch screen's capacitance and voltage data for which a responsive versus unresponsive determination can be performed.

In Step 506, engine 200 can extract, detect or otherwise identify capacitance data (or values) from each of the layers of the touch screen. In some embodiments, Step 506 can involve engine 200 identifying each intersection of EX and SE lines on the layers of the touch screen (e.g., the bonding layer 308 and substrate 304). A further example of this is discussed above in relation to FIG. 4A. Thus, in Step 506, at each EX and SE intersection, engine 200 can determine the $V_{REF}$, as discussed above at least in reference to FIGS. 4A-4B.

In Step 508, engine 200 can determine the respective $V_{OUT}$ for each intersection of EX and SE lines. Such determination can involve the execution of Eq. 1 by engine 200, as discussed above in relation to at least FIGS. 4A-4B.

In Step 510, engine 200 can perform a comparison between the values identified in Steps 506 and 508. That is, a comparison between the $V_{OUT}$ and $V_{REF}$ values is performed by engine 200. Accordingly, in some embodiments, if any of the EX and/or SE lines are damaged, there will be an out-of-range change in or absence of voltage output on the sensing lines of the region, detected, as described above.

In Step 512, based on the comparison performed by engine 200 in Step 510, engine 200 can determine whether defects, such as cracks, in the touch screen are present. In some embodiments, the defects can correspond to anomalous regions within the touch screen that correspond to each EX and SE intersection, or a set of or grouping of intersections.

In some embodiments, Step 512's determination can be based on the determined (or computed) difference value between \Tour and $V_{REF}$ (from Step 510) being compared to a voltage threshold. The voltage threshold corresponding to a voltage value (or voltage change value) that can indicate a defect in at least one layer of the touch screen. Thus, for example, if the voltage of $V_{OUT}$ is different from the voltage of $V_{REF}$ below the voltage threshold, then that intersection of EX and SE lines can be determined to correspond to a crack in the touch screen. Thus, in some embodiments, such change in voltage between $V_{OUT}$ and $V_{REF}$ (e.g., below the voltage threshold) correlates to an anomaly and enables engine 200 to pinpoint the damage or cracked region. Accordingly, in some embodiments, Step 512 can be performed for each EX and SE intersection.

In Step 514, engine 200 can determine whether cracks are identified for each EX and SE intersection. When a crack is identified for a particular EX and SE intersection, Process 500 proceeds from Step 514 to Step 516, where engine 200 determines and identifies such portion of the touch screen to be cracked. Conversely, when a crack is not identified for a particular portion, Process 500 proceeds from Step 514 to Step 518, where the portion of the touch screen is identified as responsive. In some embodiments, if no cracks are identified, engine 200 proceeds to Step 516 as a collective responsive determination for the device's touch screen.

Turning to FIG. 6, according to some embodiments, Steps 602-606 of Process 600 can be performed by pixel module 204 of detection engine 200; Step 608 can be performed by anomaly module 206; and Steps 610-614 can be performed by determination module 208.

Process 600 begins with Step 602 where a request to perform analysis of a device's screen is performed. In Step 604, the application can be executed. Accordingly, Steps 602-604 can be performed in a similar manner as discussed above in relation to Steps 502-504 of Process 500.

In Step 606, engine 200 determines a pixel status for the touch screen. In some embodiments, Step 606 involves engine 200 analyzing each pixel on the touch screen and determining whether the pixel is producing or is capable of producing valid output. In some embodiments, valid output can correspond to outputting/emitting light (e.g., brightness and/or color of an image) or display content at or above a threshold. In some embodiments, valid data can correspond to a binary assessment, whereby the pixel (e.g., LED) is either outputting light (1) or not (0).

In Step 608, engine 200 can determine dead zones on the touch screen based on the determined pixel status. In some embodiments, a dead zone can correspond to a single pixel. In some embodiments, if pixels have the same status and are adjacent to each other, they can be grouped to form a grouping, whereby a dead zone can be based therefrom.

In Step 610, engine 200 can determine whether dead zones are detected for each pixel (or pixel grouping). When a dead zone is detected, Process 600 proceeds from Step 610 to Step 612, where engine 200 determine such corresponding pixel(s) to be unresponsive. When a dead zone is not detected (for a pixel(s)), Process 600 proceeds from Step

610 to Step 612, where engine 200 determines that pixel(s) to be responsive. In some embodiments, if no dead zones are identified, engine 200 proceeds to Step 614 as a collective responsive determination for the device's touch screen.

Turning to FIG. 7, according to some embodiments, Steps 702-704 can be performed by modules 202 and 204, in a similar manner as discussed above in relation to Processes 500-600, respectively; Step 706 can be performed in a similar manner as discussed above in relation to Steps 506-516 of Process 500; Step 708 can be performed in a similar manner as discussed above in relation to Steps 506-614 of Process 600; and Steps 710-712 can be performed by determination module 208.

Process 700 begins with Step 702 where a request to analyze a device's screen is received, and in response, an application is executed that analyzes the device's screen. Accordingly, Steps 702-704 can be performed in a similar manner as discussed above in relation to Steps 502-504 of Process 500.

As discussed above, Process 700 corresponds to a comprehensive analysis of a device's touch screen respective to a crack in the touch screen as well as dead zones from certain display pixels. As such, in some embodiments, Process 700 can proceed from Step 704 to Steps 706 and 708. Thus, as discussed below, engine 200 can determine a status of the device which indicates whether the capabilities of the touch screen to display content and/or receive, recognize and/or process touch input are functioning properly according to manufacturer standards.

In some embodiments, Step 704 or 706 can be bypassed or selected, and such embodiments can be based on a user request and/or decision from engine 200. For example, if the processing of Step 706 was performed independently prior to the request in Step 702 (e.g., within a threshold period of time (e.g., within the last hour)), then engine 200 can determine that the processing of Step 706 is not required, and Process 700 can proceed via Step 704 to 708, and bypass the processing in Step 706.

Step 706's processing involves the computational analysis performed by engine 200 respective to Steps 506-516 of Process 500, discussed supra.

Step 708's processing involves the computational analysis performed by engine 200 respective to Steps 606-614 of Process 600, discussed supra.

Process 700 then proceeds from Steps 706 and/or 708 to Step 710, where engine 200 determines a status of the device. According to some embodiments, the status can correspond to whether the device's touch screen is responsive or unresponsive, which is based on the processing of Steps 706 and/or 708. Thus, in some embodiments, Step 710 can provide a status indication as to the integrity of the touch screen of the device. In some embodiments, such indication can provide information indicating a type of unresponsiveness (e.g., cracked screen and/or pixel damage).

In Step 712, engine 200 generates and provides an output related to the determined status. The output can provide a control (e.g., permission) that dictates how the device can be managed. For example, whether the device can be traded-in, receive an operating system update, download and install applications, display content, and the like. For example, if the device's touch screen is defective, the output can be leveraged by a service provider to prevent an upcoming operating system from being installed (until the screen is fixed). In another example, the service provider can automatically replace the device should the device be currently under warranty.

In some embodiments, the output can be displayed on the screen of the device. In some embodiments, the output can be provided to the service provider of the device. For example, the service provider can automatically be provided information regarding whether the device is eligible for a trade-in/upgrade. In some embodiments, the output can be other types of output, such as, but not limited to, a sound or haptic effect, which may be necessary should the device's screen be determined to not be capable of properly displaying the output.

Figure 8:
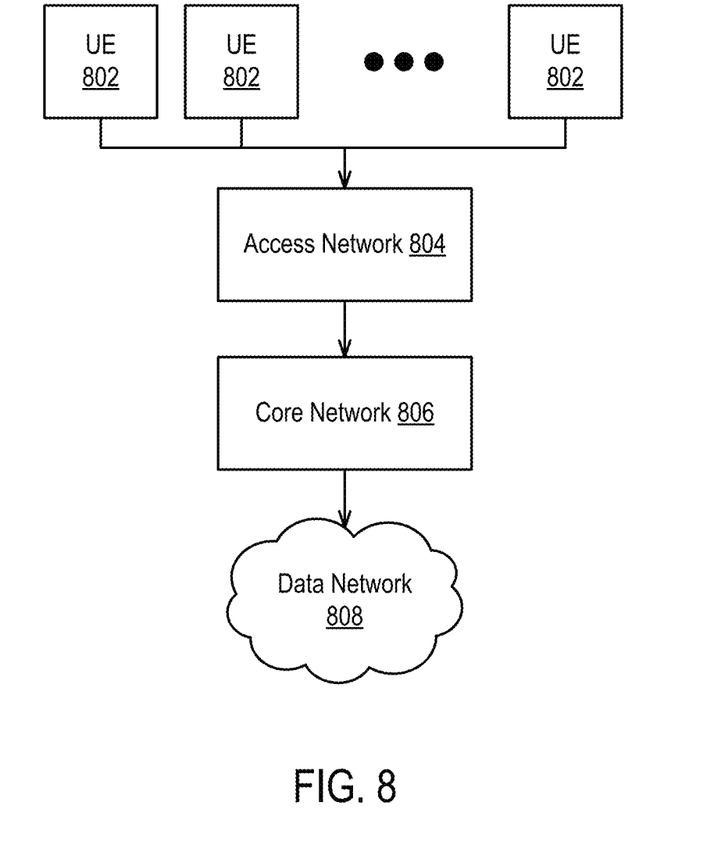
FIG. 8 is a block diagram of an example network architecture according to some embodiments of the present disclosure.

FIG. 8 is a block diagram of an example network architecture according to some embodiments of the present disclosure. In the illustrated embodiment, UE 802 accesses a data network 808 via an access network 804 and a core network 806. In the illustrated embodiment, UE 802 comprises any computing device capable of communicating with the access network 804. As examples, UE 802 may include mobile phones, tablets, laptops, sensors, IoT devices, autonomous machines, unmanned aerial vehicles (UAVs), wired devices, wireless handsets, and any other devices equipped with a cellular or wireless or wired transceiver. One non-limiting example of a UE is provided in FIG. 9.

In the illustrated embodiment of FIG. 8, the access network 804 comprises a network allowing network communication with UE 802. In general, the access network 804 includes at least one base station that is communicatively coupled to the core network 806 and coupled to zero or more UE 802.

In some embodiments, the access network 804 comprises a cellular access network, for example, a fifth-generation (5G) network or a fourth-generation (4G) network. In one embodiment, the access network 804 can comprise a NextGen Radio Access Network (NG-RAN), which can be communicatively coupled to UE 802. In an embodiment, the access network 804 may include a plurality of base stations (e.g., eNodeB (eNB), gNodeB (gNB)) communicatively connected to UE 802 via an air interface. In one embodiment, the air interface comprises a New Radio (NR) air interface. For example, in a 5G network, UE 802 can be communicatively coupled to each other via an X2 interface.

In the illustrated embodiment, the access network 804 provides access to a core network 806 to the UE 802. In the illustrated embodiment, the core network may be owned and/or operated by a network operator (NO) and provides wireless connectivity to UE 802 via access network 804. In the illustrated embodiment, this connectivity may comprise voice and data services.

At a high-level, the core network 806 may include a user plane and a control plane. In one embodiment, the control plane comprises network elements and communications interfaces to allow for the management of user connections and sessions. By contrast, the user plane may comprise network elements and communications interfaces to transmit user data from UE 802 to elements of the core network 806 and to external network-attached elements in a data network 808 such as, but not limited to, the Internet, a local area network (LAN), a wireless LAN, a wide area network (WAN), a mobile edge computing (MEC) network, a private network, a cellular network, and the like.

In the illustrated embodiment, the access network 804 and the core network 806 may be operated by a NO. However, in some embodiments, the networks (804, 806) may be operated by a private entity, different entities, and the like, and may be closed to public traffic. In these embodiments, the operator of the device can simulate a cellular network, and UE 802 can connect to this network similar to connecting to a national or regional network.

Figure 9:
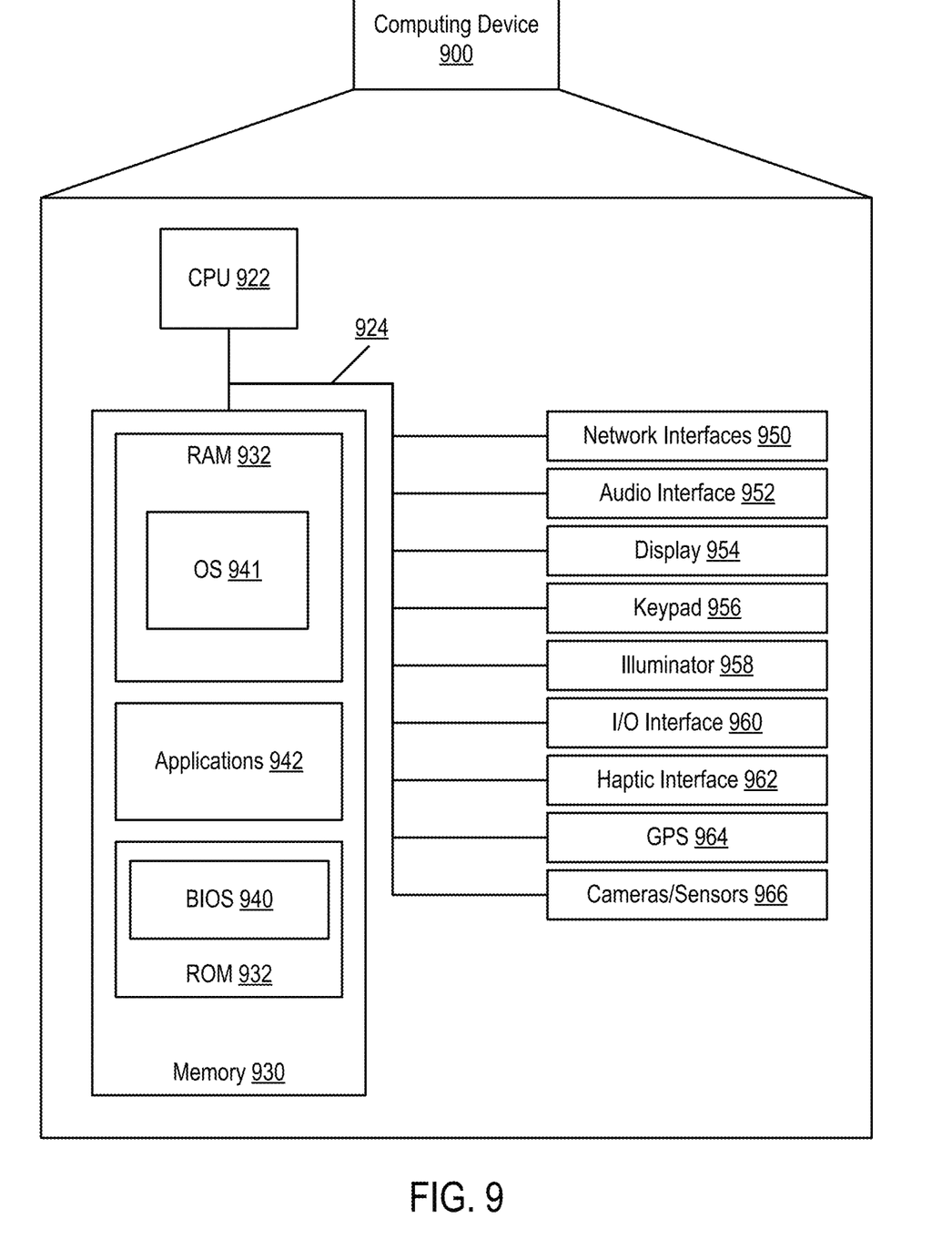
FIG. 9 is a block diagram illustrating a computing device showing an example of a client or server device used in various embodiments of the present disclosure.

FIG. 9 is a block diagram illustrating a computing device 900 showing an example of a client or server device used in the various embodiments of the disclosure. Computing device 900 can be a representation of UE 802, as mentioned above.

The computing device 900 may include more or fewer components than those shown in FIG. 9, depending on the deployment or usage of the device 900. For example, a server computing device, such as a rack-mounted server, may not include audio interfaces 952, displays 954, keypads 956, illuminators 958, haptic interfaces 962, GPS receivers 964, or cameras/sensors 966. Some devices may include additional components not shown, such as graphics processing unit (GPU) devices, cryptographic co-processors, artificial intelligence (AI) accelerators, or other peripheral devices.

As shown in FIG. 9, the device 900 includes a central processing unit (CPU) 922 in communication with a mass memory 930 via a bus 924. The computing device 900 also includes one or more network interfaces 950, an audio interface 952, a display 954, a keypad 956, an illuminator 958, an input/output interface 960, a haptic interface 962, an optional GPS receiver 964 (and/or an interchangeable or additional GNSS receiver) and a camera(s) or other optical, thermal, or electromagnetic sensors 966. Device 900 can include one camera/sensor 966 or a plurality of cameras/sensors 966. The positioning of the camera(s)/sensor(s) 966 on the device 900 can change per device 900 model, per device 900 capabilities, and the like, or some combination thereof.

In some embodiments, the CPU 922 may comprise a general-purpose CPU. The CPU 922 may comprise a single-core or multiple-core CPU. The CPU 922 may comprise a system-on-a-chip (SoC) or a similar embedded system. In some embodiments, a GPU may be used in place of, or in combination with, a CPU 922. Mass memory 930 may comprise a dynamic random-access memory (DRAM) device, a static random-access memory device (SRAM), or a Flash (e.g., NAND Flash) memory device. In some embodiments, mass memory 930 may comprise a combination of such memory types. In one embodiment, the bus 924 may comprise a Peripheral Component Interconnect Express (PCIe) bus. In some embodiments, the bus 924 may comprise multiple busses instead of a single bus.

Mass memory 930 illustrates another example of computer storage media for the storage of information such as computer-readable instructions, data structures, program modules, or other data. Mass memory 930 stores a basic input/output system ("BIOS") 940 for controlling the low-level operation of the computing device 900. The mass memory also stores an operating system 941 for controlling the operation of the computing device 900.

Applications 942 may include computer-executable instructions which, when executed by the computing device 900, perform any of the methods (or portions of the methods) described previously in the description of the preceding Figures. In some embodiments, the software or programs implementing the method embodiments can be read from a hard disk drive (not illustrated) and temporarily stored in RAM 932 by CPU 922. CPU 922 may then read the software or data from RAM 932, process them, and store them to RAM 932 again.

The computing device 900 may optionally communicate with a base station (not shown) or directly with another computing device. Network interface 950 is sometimes known as a transceiver, transceiving device, or network interface card (NIC).

The audio interface 952 produces and receives audio signals such as the sound of a human voice. For example, the audio interface 952 may be coupled to a speaker and microphone (not shown) to enable telecommunication with others or generate an audio acknowledgment for some action. Display 954 may be a liquid crystal display (LCD), gas plasma, light-emitting diode (LED), or any other type of display used with a computing device. Display 954 may also include a touch-sensitive screen arranged to receive input from an object such as a digit from a human hand.

Keypad 956 may comprise any input device arranged to receive input from a user. Illuminator 958 may provide a status indication or provide light.

The computing device 900 also comprises an input/output interface 960 for communicating with external devices, using communication technologies, such as USB, infrared, Bluetooth™, or the like. The haptic interface 962 provides tactile feedback to a user of the client device.

The optional GPS transceiver 964 can determine the physical coordinates of the computing device 900 on the surface of the Earth, which typically outputs a location as latitude and longitude values. GPS transceiver 964 can also employ other geo-positioning mechanisms, including, but not limited to, triangulation, assisted GPS (AGPS), E-OTD, CI, SAI, ETA, BSS, or the like, to further determine the physical location of the computing device 900 on the surface of the Earth. In one embodiment, however, the computing device 900 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
   identifying, by a processor of a device, display information of a touch screen of the device, the display information corresponding to capabilities for the touch screen to recognize touch input;
   determining, by the processor, voltage information related to a set of layers of the touch screen resultant from a change in capacitance;
   determining, by the processor, a set of pixels of the touch screen corresponding to a dead zone, the dead zone being an area of the touch screen that does not emit light;
   analyzing, by the processor, based on the determined voltage information and the determined set of pixels corresponding to the dead zone, the display information;
   determining, by the processor, based on the analysis of the display information, a status of the device, the status indicating whether the display is able to recognize touch input; and
   outputting, by the processor, information related to the determined status, the output information identifying the status of the touch screen, the output information further comprising mechanisms for controlling an operation of the device.

2. The method of claim 1, further comprising:
   automatically communicating, over a network, the output information related to the determined status to a service provider associated with the device.

3. The method of claim 1, further comprising:
   detecting the change in capacitance between a portion of a first layer and a corresponding portion of a second layer from the set of layers of the touch screen;
   detecting a reference voltage;
   determining an output voltage resulting from the change in capacitance; and
   analyzing the output voltage based on the reference voltage, wherein the determination of the voltage information is based on the analysis of the output voltage based on the reference voltage.

4. The method of claim 3, further comprising:
   determining, based on the analysis of the output voltage and the reference voltage, a voltage value; and
   comparing the voltage value to a voltage threshold; and
   determining, based on the comparison, whether the touch screen of the device is defective.

5. The method of claim 4, wherein the determined status of the device is based on the determination of whether the touch screen is defective.

6. The method of claim 3, wherein the set of layers comprise excitation (EX) lines and sensing (SE) lines, the EX lines and SE lines being perpendicular to each other.

7. The method of claim 6, wherein the reference voltage and the output voltage are determined for each intersection of the EX and SE lines.

8. The method of claim 3, wherein the set of layers comprise a bonding layer and substrate layer.

9. The method of claim 1, further comprising:
    determining a pixel status of each pixel on the touch screen, the pixel status indicating whether a pixel emits light or does not emit light;
    determining, based on the determined pixel status of each pixel, whether the dead zone is detected on the touch screen; and
    determining, based on the dead zone determination, whether the touch screen is unresponsive.

10. The method of claim 9, wherein the determined status of the device is based on the determination of whether the touch screen is unresponsive.

11. The method of claim 1, further comprising:
    determining to provide electronic resources to the device based on the output information.

12. The method of claim 11, wherein the electronic resources are associated with a service provider.

13. A device comprising:
    a processor configured to:
        identify display information of a touch screen of the device, the display information corresponding to capabilities for the touch screen to recognize touch input;
        determine voltage information related to a set of layers of the touch screen resultant from a change in capacitance;
        determine a set of pixels of the touch screen corresponding to a dead zone, the dead zone being an area of the touch screen that does not emit light;
        analyze the display information based on the determined voltage information and the determined set of pixels corresponding to the dead zone;
        determine, based on the analysis of the display information, a status of the device, the status indicating whether the display is able to recognize touch input; and
        output information related to the determined status, the output information identifying the status of the touch screen, the output information further comprising mechanisms for controlling an operation of the device.

14. The device of claim 13, wherein the processor is further configured to:
    detect the change in capacitance between a portion of a first layer and a corresponding portion of a second layer from the set of layers of the touch screen;
    detect a reference voltage;
    determine an output voltage resulting from the change in capacitance; and
    analyze the output voltage based on the reference voltage, wherein the determination of the voltage information is based on the analysis of the output voltage based on the reference voltage.

15. The device of claim 14, wherein the processor is further configured to:
    determine, based on the analysis of the output voltage and the reference voltage, a voltage value; and
    compare the voltage value to a voltage threshold; and
    determine, based on the comparison, whether the touch screen of the device is defective, wherein the determined status of the device is based on the determination of whether the touch screen is defective.

16. The device of claim 13, wherein the processor is further configured to:
    determine a pixel status of each pixel on the touch screen, the pixel status indicating whether a pixel emits light or does not emit light;
    determine, based on the determined pixel status of each pixel, whether the dead zone is detected on the touch screen; and
    determine, based on the dead zone determination, whether the touch screen is unresponsive, wherein the determined status of the device is based on the determination of whether the touch screen is unresponsive.

17. A non-transitory computer-readable medium tangibly encoded with instructions, that when executed by a processor of a device, perform a method comprising:
    identifying, by the processor of the device, display information of a touch screen of the device, the display information corresponding to capabilities for the touch screen to recognize touch input;
    determining, by the processor, voltage information related to a set of layers of the touch screen resultant from a change in capacitance;
    determining, by the processor, a set of pixels of the touch screen corresponding to a dead zone, the dead zone being an area of the touch screen that does not emit light;
    analyzing, by the processor, the display information based on the determined voltage information and the determined set of pixels corresponding to the dead zone;
    determining, by the processor, based on the analysis of the display information, a status of the device, the status indicating whether the display is able to recognize touch input; and
    outputting, by the processor, information related to the determined status, the output information identifying the status of the touch screen, the output information further comprising mechanisms for controlling an operation of the device.

18. The non-transitory computer-readable medium of claim 17, further comprising:
    detecting the change in capacitance between a portion of a first layer and a corresponding portion of a second layer from the set of layers of the touch screen;
    detecting a reference voltage;
    determining an output voltage resulting from the change in capacitance; and
    analyzing the output voltage based on the reference voltage, wherein the determination of the voltage information is based on the analysis of the output voltage based on the reference voltage.

19. The non-transitory computer-readable medium of claim 18, further comprising:
    determining, based on the analysis of the output voltage and the reference voltage, a voltage value; and
    comparing the voltage value to a voltage threshold; and
    determining, based on the comparison, whether the touch screen of the device is defective, wherein the determined status of the device is based on the determination of whether the touch screen is defective.

20. The non-transitory computer-readable medium of claim 17, further comprising:
    determining a pixel status of each pixel on the touch screen, the pixel status indicating whether a pixel emits light or does not emit light;
    determining, based on the determined pixel status of each pixel, whether the dead zone is detected on the touch screen; and
    determining, based on the dead zone determination, whether the touch screen is unresponsive, wherein the determined status of the device is based on the determination of whether the touch screen is unresponsive.

* * * * *